United States Patent [19]

Keller

[11] 3,731,229

[45] May 1, 1973

[54] CIRCUIT ARRANGEMENT FOR MAINTAINING THE OSCILLATIONS OF AN ELECTRO-MECHANICAL OSCILLATOR

[75] Inventor: Hans Keller, Freiburg, Germany

[73] Assignee: ITT Industries, Inc., New York, N.Y.

[22] Filed: Aug. 4, 1971

[21] Appl. No.: 169,015

[30] Foreign Application Priority Data

Aug. 22, 1970 Germany...............P 20 41 827.3

[52] U.S. Cl. ..............331/116 M, 58/23 A, 318/128, 331/113 R

[51] Int. Cl. ............................G04c 3/04, H03b 5/30

[58] Field of Search..............331/116 M, 156, 113 R; 58/23 R, 23 A, 23 AC, 23 TF; 310/25; 318/128

[56] References Cited

UNITED STATES PATENTS 3,553,955 1/1971 Keeler et al...........................58/28 R

OTHER PUBLICATIONS

Shaull, "Induction–Triggered Two–Terminal Electronic Clock Driver", HDL Technical Disclosure Bulletin, No. 1, 29 February 1964.

*Primary Examiner*—Roy Lake
*Assistant Examiner*—Siegfried H. Grimm
*Attorney*—C. Cornell Remsen, Jr. et al.

[57] ABSTRACT

This is a circuit for driving an electro-mechanical oscillator having one coil and two complementary transistors. The emitter resistor of the control transistor is connected to that end of the coil not facing the supply voltage. The emitter capacitor of the control transistor is connected to the supply voltage.

1 Claim, 3 Drawing Figures

INVENTOR
HANS KELLER
BY Vincent B. Ingrassia
AGENT

CIRCUIT ARRANGEMENT FOR MAINTAINING THE OSCILLATIONS OF AN ELECTRO-MECHANICAL OSCILLATOR

BACKGROUND OF THE INVENTION

This invention relates to a circuit arrangement comprising two complementary transistors for maintaining the oscillations of electro-mechanical oscillators (balance wheels, tuning forks, pendula, etc.) with the aid of one single coil and a magnet system which are moved in relation to one another by the oscillator, with the coil being arranged in the collector circuit of the one transistor (driving transistor), the base of the other transistor (control transistor) being coupled to the collector of the driving transistor, and the base of the driving transistor being coupled to the collector of the control transistor.

For maintaining the oscillations of electro-mechanical oscillators as used for example in clocks or watches as balance wheels, tuning forks, pendula, etc., it is known to use electronic transistor circuits. These circuits may be divided into two classes, namely those employing two coils — i.e. one control and one driving coil — for maintaining the mechanical oscillation, and those requiring only one single (driving) coil.

Single-coil circuits for clock and watch drives usually contain two complementary transistors, i.e. one driving transistor in the collector branch of which there is connected the (driving) coil, and one control transistor with the base thereof, via suitable circuit elements, being connected to the collector of the driving transistor, and with the collector thereof, via further circuit elements, if necessary, being connected to the base of the the driving transistor.

In such types of circuits there will result some advantages when the coupling between the two transistors is effected with respect to direct current. Circuits of this kind are known from e.g. the French Letter Patent No. 1,447,424 and the French published Patent application No. 2,000,706.

By way of example there is shown in FIG. 1 of the accompanying drawings, the circuit according to the aforementioned French patent application. In the collector branch of the driving transistor T1 there is arranged the only coil L which, on one end, is connected to the collector of the driving transistor T1 and, on the other hand, to the source of supply voltage $U_B$. The base of the complementary control transistor T2 is connected via the resistor R2 to the collector of the driving transistor T1 and, via the resistor R1 to earth or mass potential. The base of the driving transistor T1 and the collector of the control transistor T2 are connected to one another directly. The emitter of the driving transistor T1 is applied to the circuit ground (i.e. earth potential) while the emitter of the control transistor T2 is connected to the source of supply voltage $U_B$.

The coil cooperates with a not shown magnet system which induces voltages in the coil and whereupon a magnetic field is generated by the coil, which field drives the mechanical oscillator as soon as both the coil and the magnet system are moved in relation to one another.

One disadvantage of the aforementioned known types of circuits is that DC coupling between the driving and the control transistor provides a regenerative feedback so that, in the case of an unfavorable dimensioning, the two transistors may be permanently switched on or driven into saturation. In particular, this danger exists when the current gains of the two transistors and/or the resistance values of the coupling resistors have great tolerances, as is likely to be the case, for example, when arranging such circuits as monolithic integrated circuits (IC's).

An improvement can be achieved by connecting a feedback resistor to the emitter branch of the control transistor. In order thus not to reduce the AC gain as well, this resistor is appropriately bridged by a capacitor. This configuration is shown in FIG. 2. In the emitter circuit there are arranged both the resistor R3 and the capacitor C as connected parallel in relation thereto, with this parallel arrangement at one end being connected to the emitter of the control transistor T2, at the other end being connected to the source of supply voltage.

For causing the capacitor C to become effective, it must have a minimum capacitance value. On the other hand, however, the time constant of the RC-circuit may not be too high, because otherwise the capacitor C will be charged increasingly via the pulse-shaped emitter current of the control transistor T2. Therefore, both the value of the emitter resistor and also its protective effect are restricted.

SUMMARY OF THE INVENTION

It is the object of the invention to provide a circuit in which the two transistors are not permanently switched on.

According to the invention this is accomplished in that the emitter of the control transistor, with respect to AC voltage, is connected to the source of supply voltage and, with respect to direct current, it connected to the collector-sided end of the coil via a linear network.

One type of embodiment of the invention resides in the fact that the emitter of the control transistor, via a capacitor, is connected to the source of supply voltage and, via an ohmic resistor, to the collector-sided end of the coil.

DESCRIPTION OF THE PREFERRED EMBODIMENT

Figure 1:
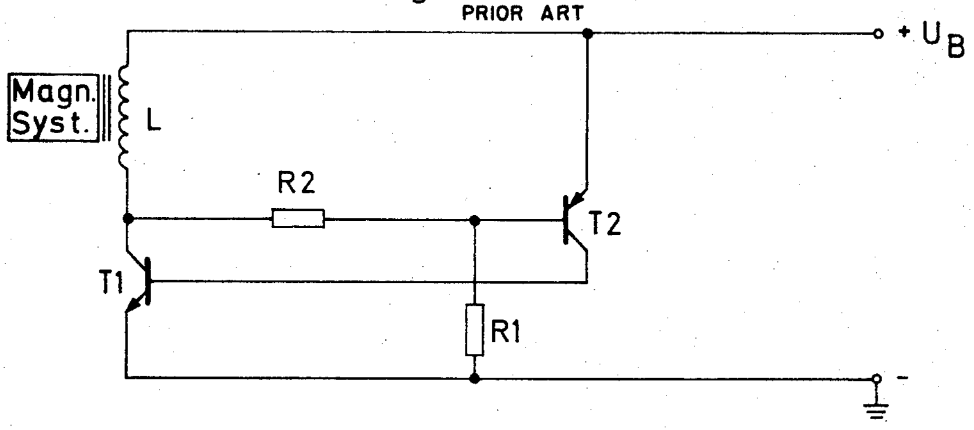
Fig. 1 PRIOR ART
FIGS. 1 and 2 show conventional circuit arrangements.
Figure 2:
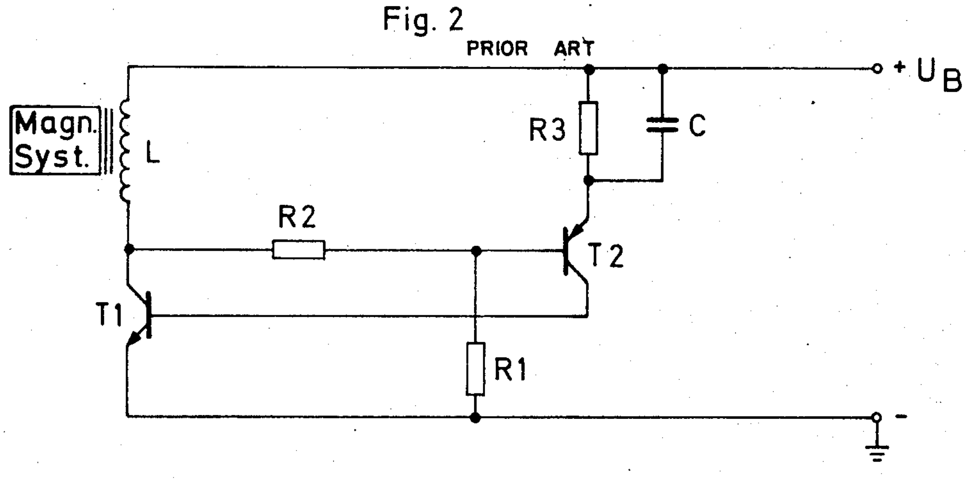
Fig. 2 PRIOR ART
Figure 3:
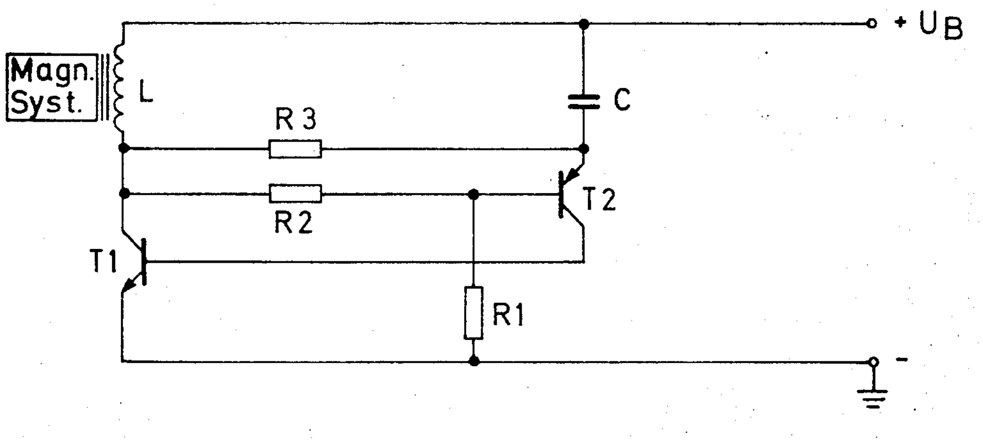
FIG. 3 shows an inventive circuit embodiment.

This type of embodiment of the invention is shown in FIG. 3. The emitter resistor R3 according to FIG. 2 is in this case no longer connected with its emitter-distant end to the source of supply voltage $U_B$ but is connected in the inventive manner to the collector-sided end of the coil L, and hence in the shown example of embodiment, also to the collector of the driving transistor T1.

Experiments have shown that the inventive measure of connecting the emitter resistor of the control transistor to the collector-sided end of the coil, has no disadvantageous influence upon the pulse operation of the circuit, as one would tend to expect at first. In fact, the circuit arrangement according to the invention offers the considerable advantage that even in the case of great tolerances of the characteristics that even the employed components, both transistors are not permanently switched on, which would prevent the electro-mechanical oscillator from receiving driving pulses and would cause its oscillations to cease.

It is to be understood that the foregoing description of specific examples of this invention is made by way of example only and is not to be considered as a limitation on its scope.

I claim:

1. A circuit arrangement for driving an electro-mechanical oscillator, comprising:

a magnet system;

a single coil magnetically coupled to said magnet system;

a source of supply voltage;

a drive transistor having base emitter and collector terminals;

a control transistor of complimentary conductivity type to that of said drive transistor, said control transistor having base, emitter and collector terminals, one end of said coil coupled to the collector of said drive transistor, the base of said control transistor being coupled to the collector of said drive transistor, the base of said drive transistor being coupled to the collector of said control transistor, the emitter of said drive transistor coupled to a first pole of said supply voltage, said second pole of said supply voltage coupled to another end of said coil;

a capacitor coupled between the emitter of said control transistor and said second pole;

a first resistor coupled between the emitter of said control transistor and said one end of said coil; and a second resistor coupled between the base of said control transistor and said first pole.

* * * * *